(12) United States Patent
Liu

(10) Patent No.: US 10,313,881 B2
(45) Date of Patent: Jun. 4, 2019

(54) SYSTEM AND METHOD OF AUTHENTICATION BY LEVERAGING MOBILE DEVICES FOR EXPEDITING USER LOGIN AND REGISTRATION PROCESSES ONLINE

(71) Applicant: Lawrence Liu, Chesterfield, VA (US)

(72) Inventor: Lawrence Liu, Chesterfield, VA (US)

( * ) Notice: Subject to any disclaimer, the term of this patent is extended or adjusted under 35 U.S.C. 154(b) by 178 days.

(21) Appl. No.: 15/272,381

(22) Filed: Sep. 21, 2016

(65) Prior Publication Data

US 2017/0086069 A1 Mar. 23, 2017

Related U.S. Application Data

(60) Provisional application No. 62/221,323, filed on Sep. 21, 2015.

(51) Int. Cl.
```
G06F 21/31      (2013.01)
H04W 12/06      (2009.01)
H04L 9/00       (2006.01)
H04L 9/32       (2006.01)
H04L 29/06      (2006.01)
```

(52) U.S. Cl.
CPC ............ *H04W 12/06* (2013.01); *G06F 21/31* (2013.01); *H04L 9/006* (2013.01); *H04L 9/3213* (2013.01); *H04L 9/3215* (2013.01); *H04L 9/3228* (2013.01); *H04L 9/3247* (2013.01); *H04L 63/0853* (2013.01); *H04L 63/18* (2013.01); *H04L 63/0876* (2013.01); *H04L 63/102* (2013.01); *H04L 2209/80* (2013.01)

(58) Field of Classification Search
None
See application file for complete search history.

(56) References Cited

U.S. PATENT DOCUMENTS

| | | | | |
|---|---|---|---|---|
| 7,735,122 B1* | 6/2010 | Johnson | ............... | G06Q 20/383 705/74 |
| 2007/0011724 A1* | 1/2007 | Gonzalez | ............... | G06F 21/31 726/4 |
| 2008/0201768 A1* | 8/2008 | Koo | ............... | G06F 21/34 726/6 |
| 2010/0293189 A1* | 11/2010 | Hammad | ............... | G06F 21/31 707/769 |
| 2012/0018511 A1* | 1/2012 | Hammad | ............... | G06Q 20/12 235/380 |

(Continued)

*Primary Examiner* — Jason Chiang

(57) ABSTRACT

A method of authentication by leveraging mobile devices for expediting user login and registration processes provides a generic method for remotely authenticating login sessions using a portable computing device. An authentication initiation code (AIC) is generated and then displayed on the portable computing device. The AIC is inputted into a login feature of a relying party and a user entry is received through the login feature. An authentication request is sent to the portable computing device. User verification data is located for the relying party within a secure vault of personal identification data. The user is prompted to approve or deny the authentication request if the user verification data for the relying party is found within the secure vault. The user verification data is then used to grant access to restricted portions of the relying party if the authentication request is approved through the portable computing device.

13 Claims, 18 Drawing Sheets

(56) References Cited

U.S. PATENT DOCUMENTS

| | | | | |
|---|---|---|---|---|
| 2013/0232336 | A1* | 9/2013 | Cheung | H04L 9/006 |
| | | | | 713/156 |
| 2013/0311768 | A1* | 11/2013 | Fosmark | G06Q 20/3223 |
| | | | | 713/155 |
| 2014/0237552 | A1* | 8/2014 | Yoo | H04L 9/3228 |
| | | | | 726/3 |
| 2015/0244697 | A1* | 8/2015 | Siddesh | G05B 19/0428 |
| | | | | 726/7 |
| 2015/0281227 | A1* | 10/2015 | Fox Ivey et al. | H04L 63/0853 |
| | | | | 713/168 |
| 2016/0034990 | A1* | 2/2016 | Kannair | G06Q 30/0609 |
| | | | | 705/51 |
| 2016/0105546 | A1* | 4/2016 | Keys | H04M 3/382 |
| | | | | 379/88.01 |
| 2016/0381080 | A1* | 12/2016 | Reddem | H04L 63/0884 |
| | | | | 726/1 |

* cited by examiner

SYSTEM AND METHOD OF AUTHENTICATION BY LEVERAGING MOBILE DEVICES FOR EXPEDITING USER LOGIN AND REGISTRATION PROCESSES ONLINE

The current application claims a priority to the U.S. Provisional Patent application Ser. No. 62/221,323 filed on Sep. 21, 2015.

FIELD OF THE INVENTION

The present invention relates generally to a means of authenticating an end user for the purpose of granting access to online accounts or computer resources protected by a sign-in process or for making electronic payments that require the user's explicit authorization. More specifically, the present invention is a system and method of authentication leveraging mobile devices for expediting user login and registration processes online. The present invention allows a user to use a portable or mobile computing device to securely authenticate remote login sessions so that the user can sign in to a website or application without having to manually key in login credentials such as the username or password.

BACKGROUND OF THE INVENTION

In the Internet era, an online authentication process typically begins with a screen prompt asking the end user to input sign-in credentials such as a username and password. A website or application (generally referred to as service hereafter) then verifies the user input against information obtained during the user registration with the service. Despite its popular use password-based authentications suffer from poor security and clumsy user experience. They are not only inherently weak against many common cyber threats but also add unpleasant friction to online transactions, as many users are averse to creating yet another password given their struggles in keeping track of the existing ones. Various methods which have been created as additional measures to strengthen the password-based authentication approach, often at the expense of further degrading the user login experience, fail to address the fundamental security issue associated with using passwords. Given the challenges they are facing many users have resorted to relying other means to manage their sensitive login information. For example, some users chose to write down passwords and relevant account information on paper or save them in unencrypted computer files or emails, which inevitably lead to tarnished security and bad user experience. On the other hand, massive amount of sensitive user identifying information is redundantly stored on countless servers across the Internet, attracting all types of nefarious actors to attack, breach and eventually compromise such valuable information of online consumers. As online presence becoming increasingly important in people's lives, user privacy and account security should no longer be left at the mercy of arbitrary password practices commissioned by the varying websites born on the Internet.

Numerous technological approaches have been attempted in addressing the challenges associated with protecting online user accounts, including the use of multi-factor authentications such as specialized hardware token, SMS text messaging or one-time password (OTP) token etc. While multi-factor authentications significantly boost the security of the user login process their wide range acceptances have been impeded by user experience and additional cost concerns associated with large scale deployment of such technologies.

With the emergence of personal mobile devices such as smartphones recent authentication solutions have been designed to take advantage of the rich sensory found on modern mobile devices, such as the built-in cameras or fingerprint scanners to replace or supplement passwords as means to authenticate end users. Despite their improved usability these mobile assisted authentication solutions continue to suffer from various security issues. As an example, in one such solution, users are presented with QR images or animated waves, upon scanning of a such image using a user's mobile device the user's login session on a remote desktop computer may be remotely authenticated. Because users are not able to distinguish a legitimate QR image from one planted by a potential hacker such solution without additional preventive measures could subject users to online phishing or image substitution attacks. Furthermore, most mobile assisted authentication solutions existed today use certain device information or meta data as authentication credentials. As a result, such solutions are not only inherently weak in security but are limited to working with designated replying parties only. They also require device registration in order to bind a new device to a registered user account before it can be used for authenticating user logins.

Some recent solutions try to mitigate the security problem by showing multiple numbers on user's mobile device then asking the user to tap on the one number that's also displayed on the user's desktop computer where the login session is initiated. Even though the matching number technique makes session spoofing more difficult, patient and determined hackers will still be able to target their victims with careful foreplaning since these solutions still rely on the user to key in certain account identifier in order to start the login process. Lastly, most of these mobile assisted authentication solutions rely on custom technology to integrate with specific websites, making them incompatible for broader implementation for relying parties.

The present invention addresses following needs:
  Offers a generic method that can remotely authenticate login sessions using user's mobile device with a security level no weaker than current two-factor authentication methods.
  Offers a more pleasant user experience that is simpler than the existing single-factor authentication methods.
  Allows easy integration with any existing website so that end users don't need to download many different authentication apps for different websites.
  Effectively address common security threats imposed by key loggers, password brute forcing and URL phishing etc.
  Securely store user login credentials and identifying information on each user's own mobile device as opposed to storing them in the databases of individual websites.

The present invention accomplishes the following goals:
  Unlike many other algorithm-based security tokens, the AICs used in the present invention may be randomly generated.
  Unlike most security tokens, the AICs themselves are not the secrets used to authenticate the end user. Knowing the AIC associated with a given device would only allow the initiation of the authentication request but not the approval of it. The user still needs to consent to the request before the actual identity verification data can be used to approve the login.

A compromise of the communication server or its communication channel alone will not subject the user's account to unauthorized access since the communication server is not involved in authenticating or transmitting the identity verification information.

Instead of relying on end users to inspect for bogus website URLs the system will always verify and ensure the authentication response can only be submitted to the intended web address to effectively end phishing attacks.

Since the end users are not required to key in passwords during the authentication process spyware such as key logger will become inept in stealing user's login credentials.

DETAIL DESCRIPTIONS OF THE INVENTION

All illustrations of the drawings are for the purpose of describing selected versions of the present invention and are not intended to limit the scope of the present invention.

Figure 1:
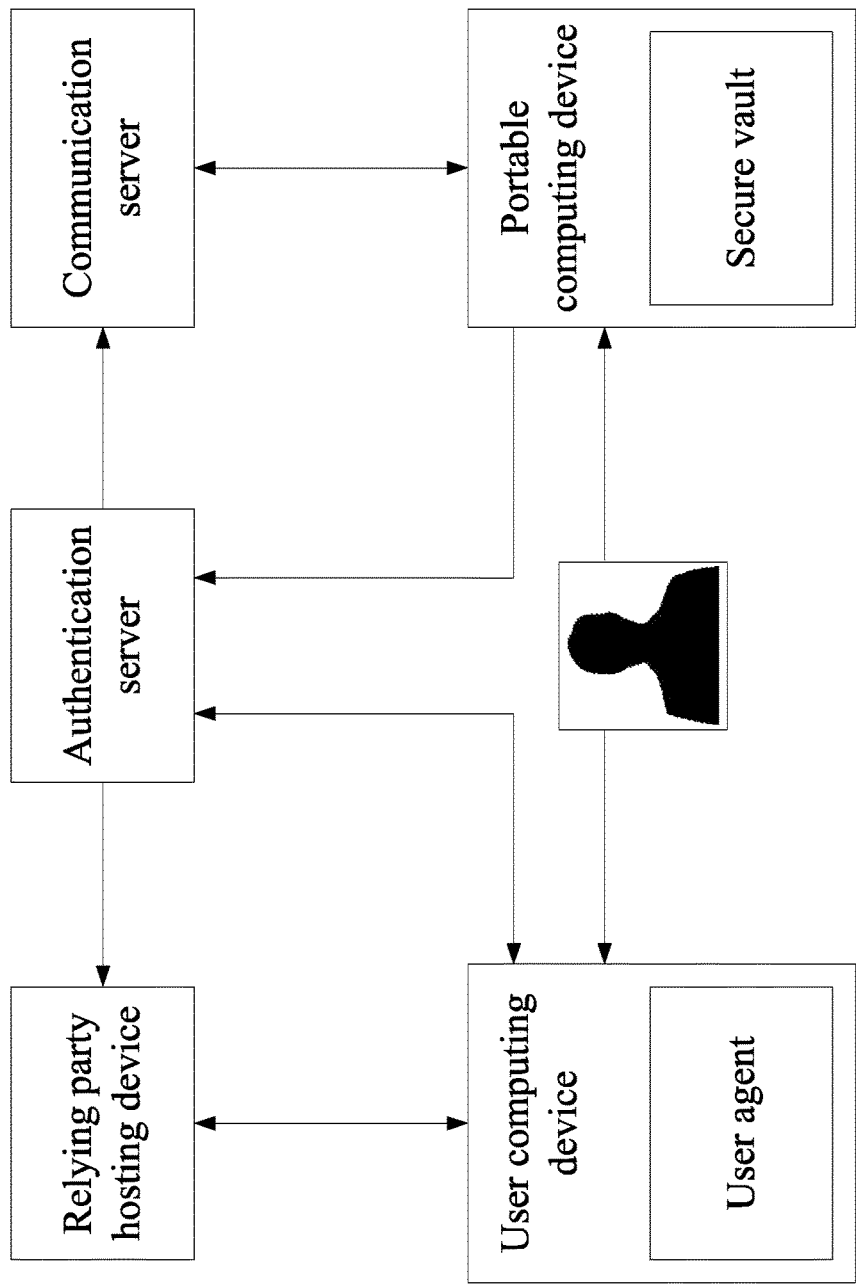
FIG. 1 is a diagram of the system of the present invention.
Figure 2A:
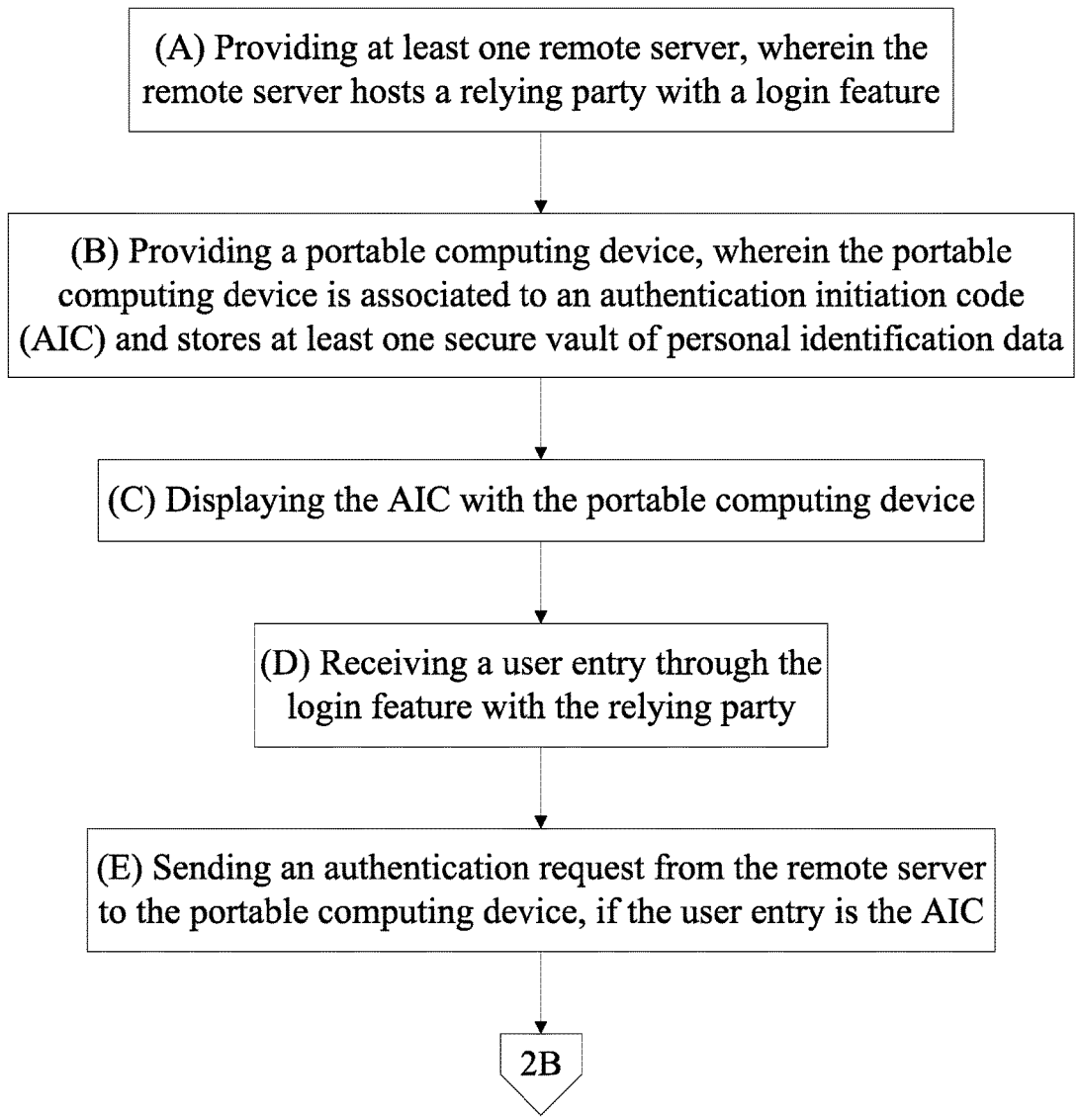
FIG. 2A is a flowchart of the overall process that is followed by the present invention.
Figure 2B:
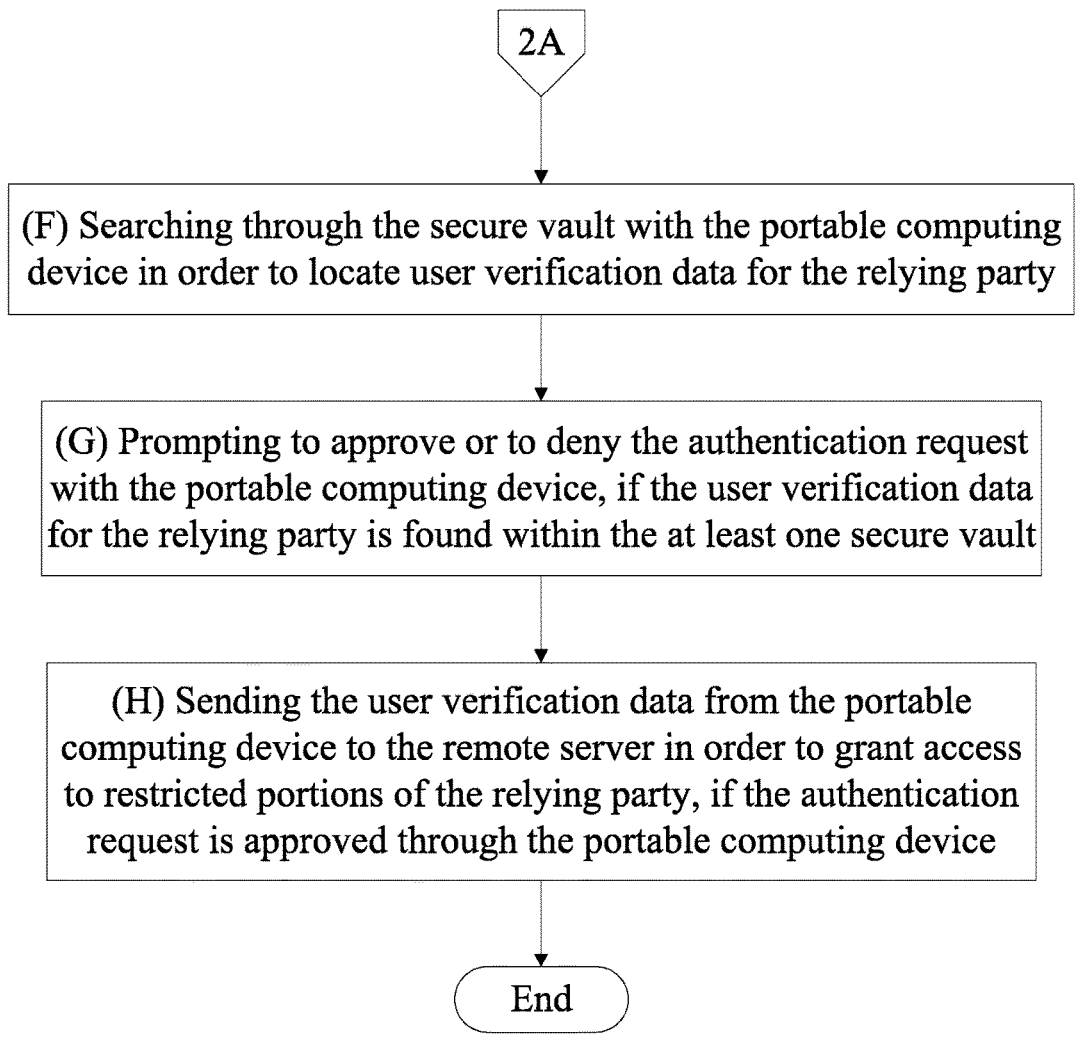
FIG. 2B is a continuation of the flowchart in FIG. 2A.

The present invention is a system and method of authentication leveraging mobile devices for expediting user login and registration processes online. A diagram and the overall process that is followed by the present invention are shown in FIG. 1, FIG. 2A, and FIG. 2B, while secondary processes that are followed by the present invention are shown in FIGS. 3-16.

Within the system of the present invention, at least one remote server is utilized to host a relying party with a login feature (Step A). The present invention utilizes a portable computing device such as, but not limited to, a smartphone, a smartwatch, a tablet computer, or similar device. The portable computing device is associated to an authentication initiation code (AIC) and stores a secure vault of personal identification data (Step B). Within the context of the present invention, the secure vault of personal identification data is solely managed by the portable computing device and no personal identification data needs to be stored by the relying party. However, the present invention may be integrated with legacy websites with member databases.

The overall process that is followed by the method of the present invention is herein discussed. The AIC is displayed with the portable computing device and is utilized when accessing the relying party (Step C). Within the context of the present invention, the AIC is a numerical code that is displayed on the portable computing device. In the preferred embodiment of the present invention, the AIC is displayed through an application that is installed on the portable computing device. A user entry is received through the login feature with the remote server when accessing the relying party (Step D). The login feature is accessed via a user agent on a different computing device such as a desktop computer or a laptop computer. The user agent, usually a web browser, acts as an interface that allows the user to interact with the relying party. An authentication request is sent from the remote server to the portable computing device if the user entry is a valid AIC (Step E). More specifically, the AIC is inputted through the login feature when accessing the relying party in lieu of entering a traditional username and password combination. After the authentication request is sent to the portable computing device, the secure vault on the portable computing device is searched in order to locate user verification data for the relying party (Step F). The user verification data is the key information that ultimately grants the user login at the relying party. The user verification data may include a correct sign-in credential or a cryptographic key for generating digital signature that is verifiable by the authentication server or the relying party depending on the specific configuration of the solution. The user is prompted to approve or deny the authentication request with the portable computing device if the user verification data for the relying party is found within the secure vault (Step G). In the preferred embodiment of the present invention, the user receives a push notification alert through the application installed on the portable computing device asking the user to approve or deny the authentication request. The user verification data is sent from the portable computing device to the remote server in order to grant access to restricted portions of the relying party if the authentication request is approved through the portable computing device (Step H). The user verification data enables the user to access the restricted functions of the relying party. It is important to note that the user is not required to provide any information to the relying party aside from the AIC at any point along this process. If the authentication request is denied or ignored, the user's session login is rejected.

Figure 3:
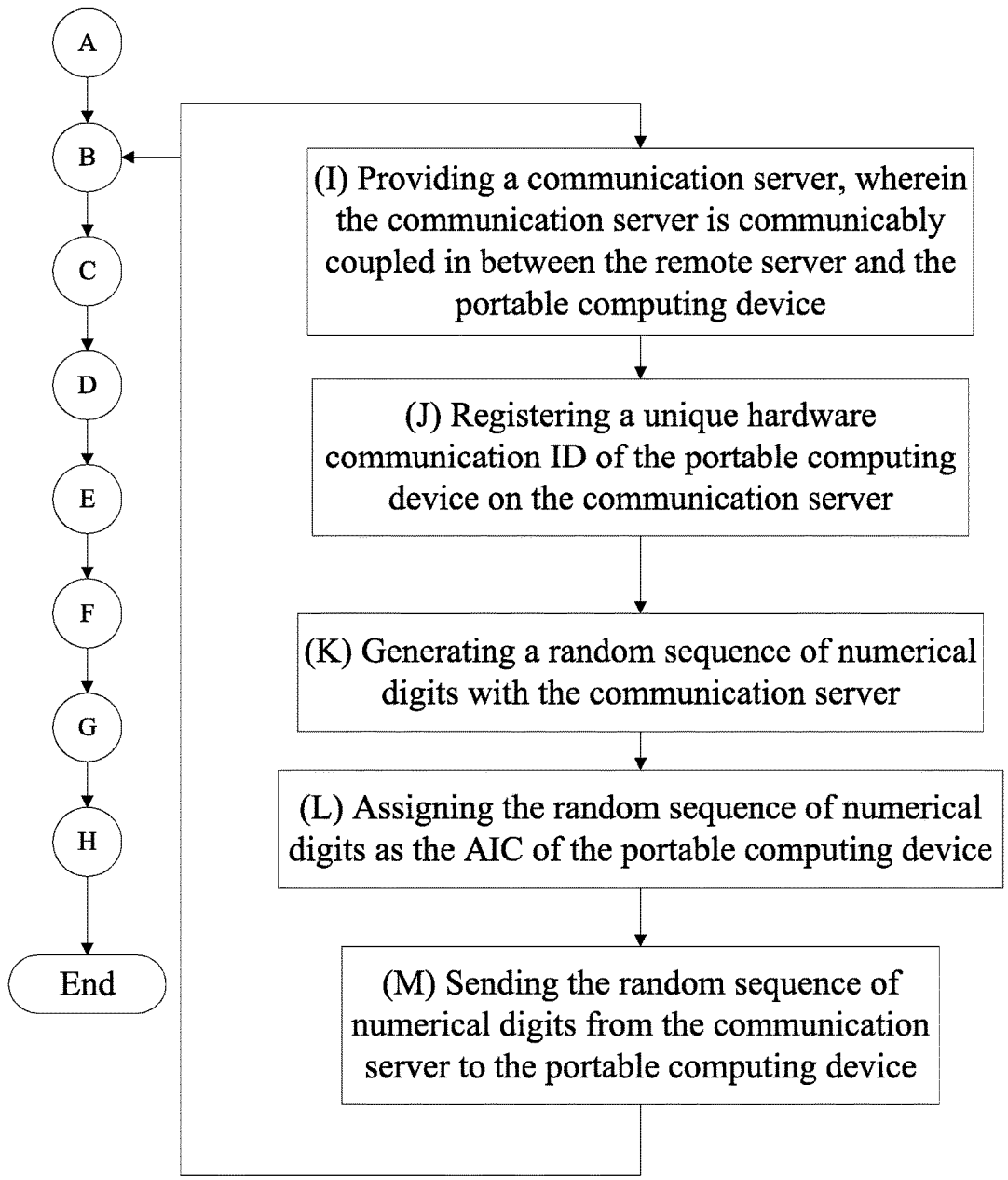
FIG. 3 is a flowchart of a sub-process that is followed by the present invention.
Figure 6:
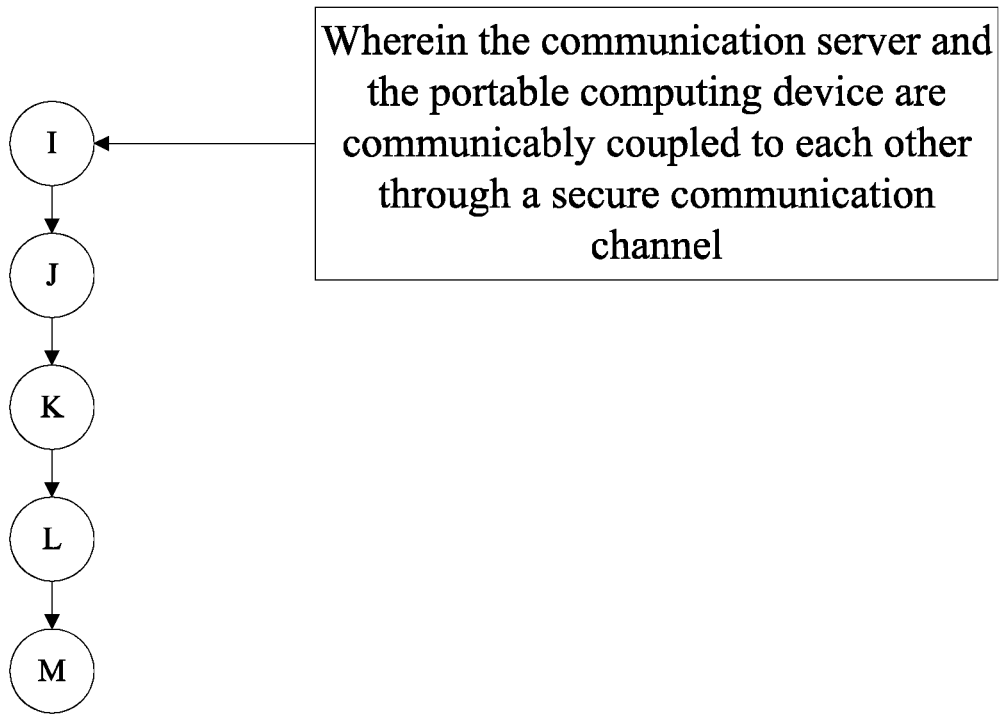
FIG. 6 is a flowchart of a sub-process that is followed by the present invention.

With reference to FIG. 3, a sub-process for the method of the present invention is herein discussed. A communication server is communicably coupled in between the remote server and the portable computing device (Step I). The communication server is utilized to provide the AIC through the portable computing device. With reference to FIG. 6, in the preferred embodiment of the present invention, the communication server and the portable computing device are communicably coupled to each other through a secure communication channel using a (wide area network) WAN transport with Secure Socket Layer (SSL) or Transport Layer Security (TLS) enabled. A unique hardware communication ID of the portable computing device is programmatically registered on the communication server in order to associate the portable computing device with the unique hardware communication ID and a unique AIC (Step J). In the preferred embodiment of the present invention, a random sequence of numerical digits is generated with the communication server and assigned as the AIC of the portable computing device (Step K and Step L). The AIC is unique to the portable computing device and is entered by the user during login in lieu of entering a traditional username and password combination. The random sequence of numerical digits is sent from the communication server to the portable computing device, allowing the AIC to be viewed on the portable computing device (Step M).

Figure 4:
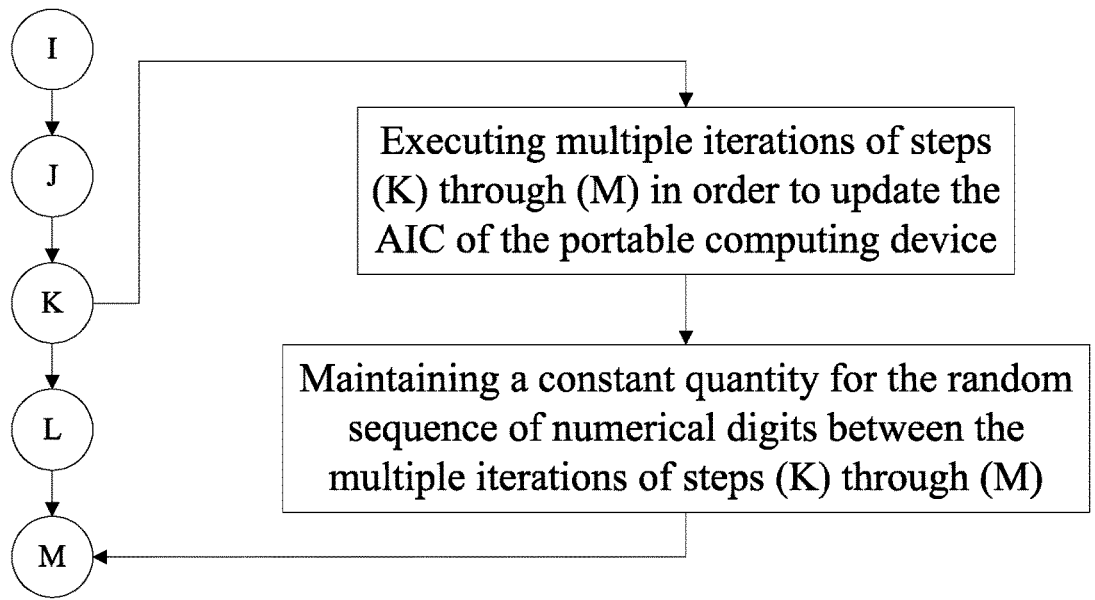
FIG. 4 is a flowchart of a sub-process that is followed by the present invention.
Figure 5:
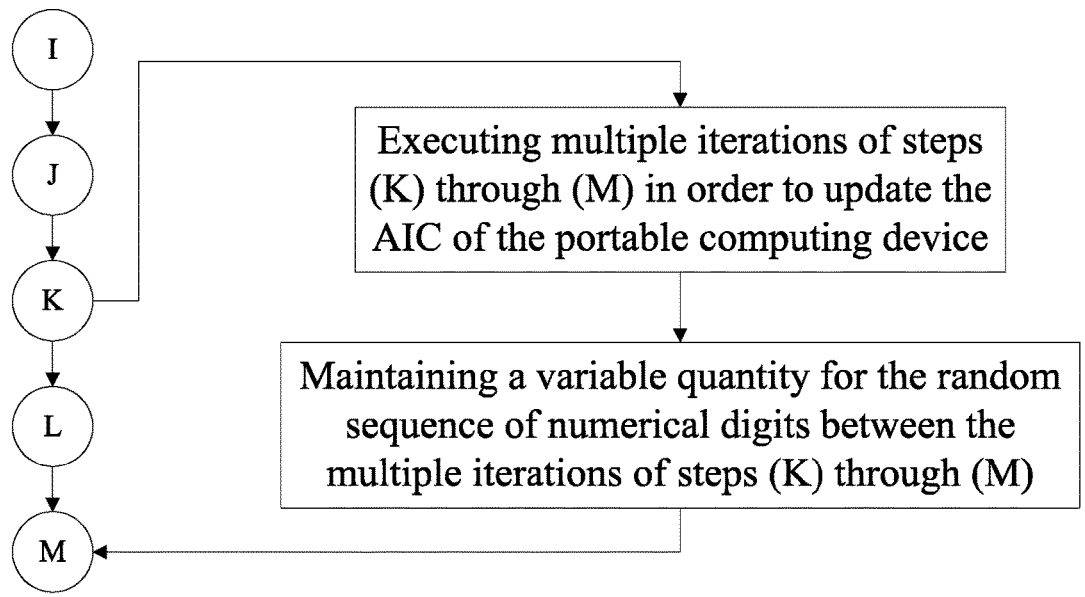
FIG. 5 is a flowchart of a sub-process that is followed by the present invention.

With reference to FIG. 4, the AIC of the portable computing device is regularly updated and refreshed by executing multiple iterations of Step K through Step M in order to update the AIC of the portable computing device. A constant quantity for the random sequence of numerical digits may be maintained between the multiple iterations of Step K through Step M. More specifically, each random sequence of numerical digits may be of the same length (for example, 10 digits in length). Alternatively, with reference to FIG. 5, a variable quantity for the random sequence of numerical digits may be maintained between the multiple iterations of Step K through Step M. In the case of a variable quantity, each random sequence of numerical digits may be of a different length (for example, three digits to 10 digits in length). In the preferred embodiment of the present invention, the time interval for the AIC to be refreshed directly correlates to the length of the AIC with shorter AICs getting refreshed more frequently then longer AICs.

Figure 7:
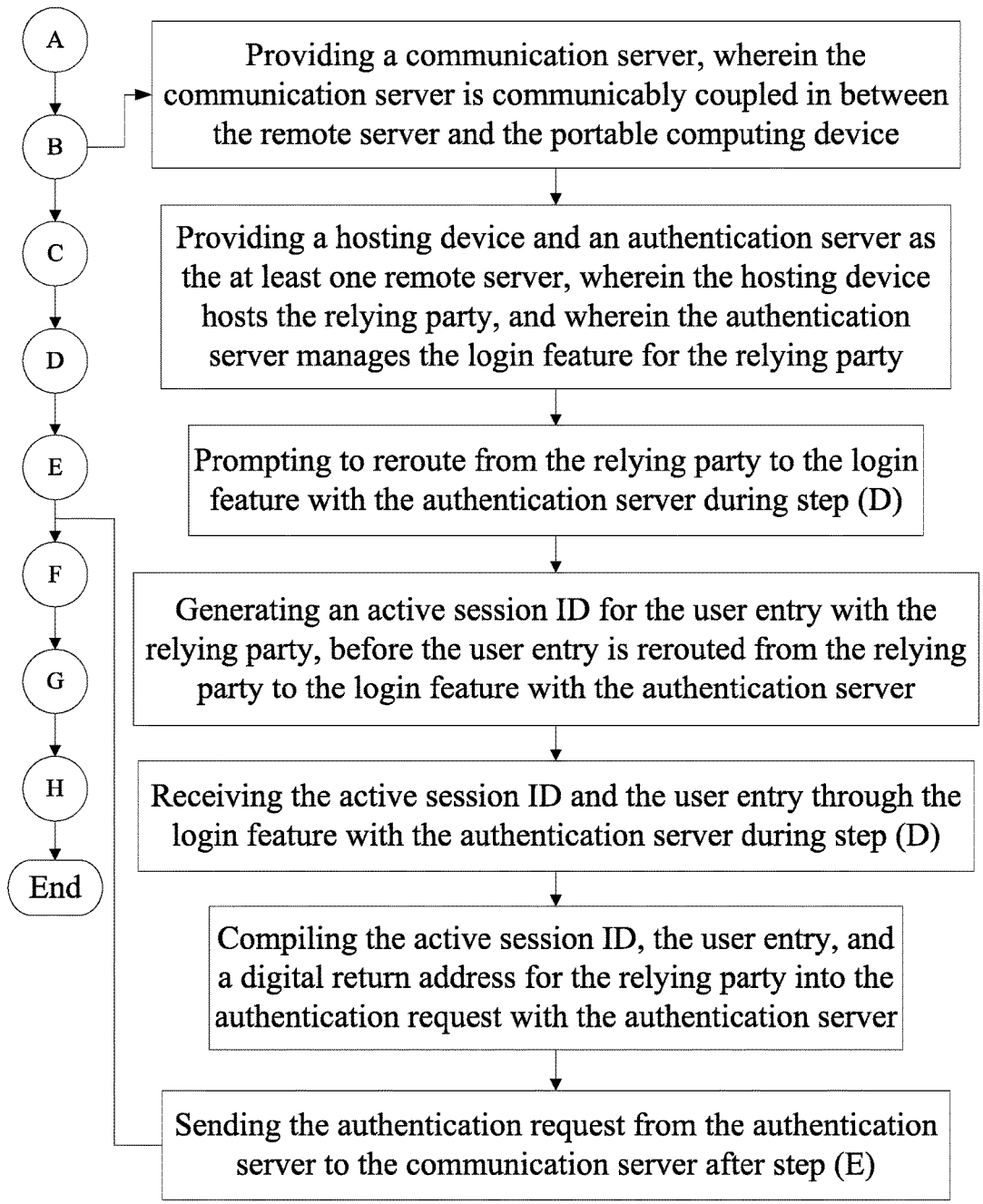
FIG. 7 is a flowchart of a sub-process that is followed by the present invention.

With reference to FIG. 7, another sub-process for the method of the present invention is herein discussed. In the preferred embodiment of the present invention, a hosting device and an authentication server are provided as at least one remote server. The hosting device hosts the relying party while the authentication server manages the login feature for the relying party. In the preferred embodiment of the present invention, the authentication server is also an Identity Provider (IdP). During an authentication process, user browser is redirected from the relying party to the login feature on the authentication server during Step D. The login feature is used when entering the AIC in order to request access to the relying party. An active session ID is generated for the user session with the relying party, before the user session is transferred from the relying party to the login feature with the authentication server. The active session ID and the user input are received through the login feature with the authentication server during Step D, thus associating the active session ID with the user input through the login feature. The active session ID, the user input, and a digital return address for the relying party are compiled into an authentication request with the authentication server. In the preferred embodiment of the present invention, the digital return address is the Uniform Resource Identifier (URI) of the relying party. The authentication request is sent from the authentication server to the communication server after Step E. The active session ID, the user input, and the digital return address are thus transmitted from the authentication server to the communication server.

Figure 8:
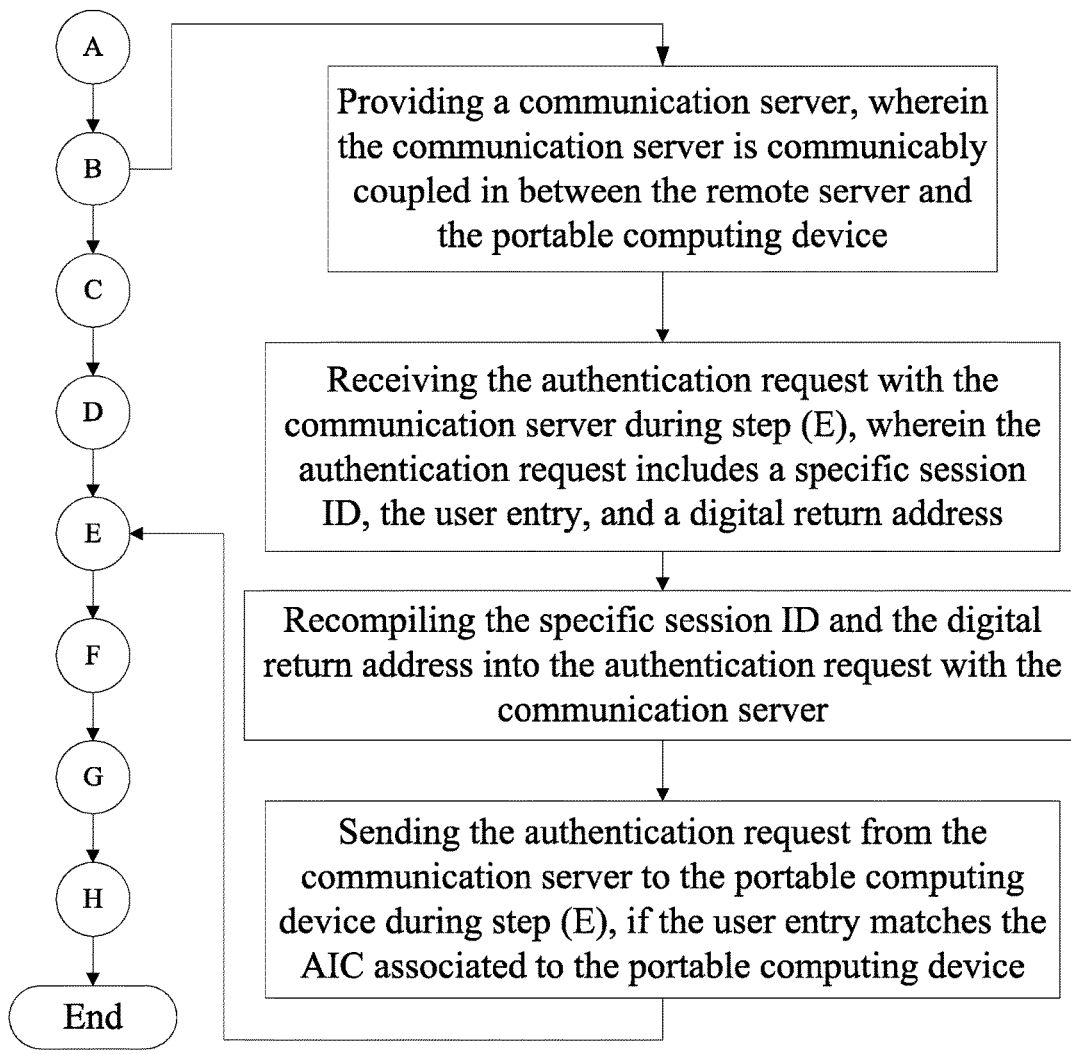
FIG. 8 is a flowchart of a sub-process that is followed by the present invention.
Figure 9:
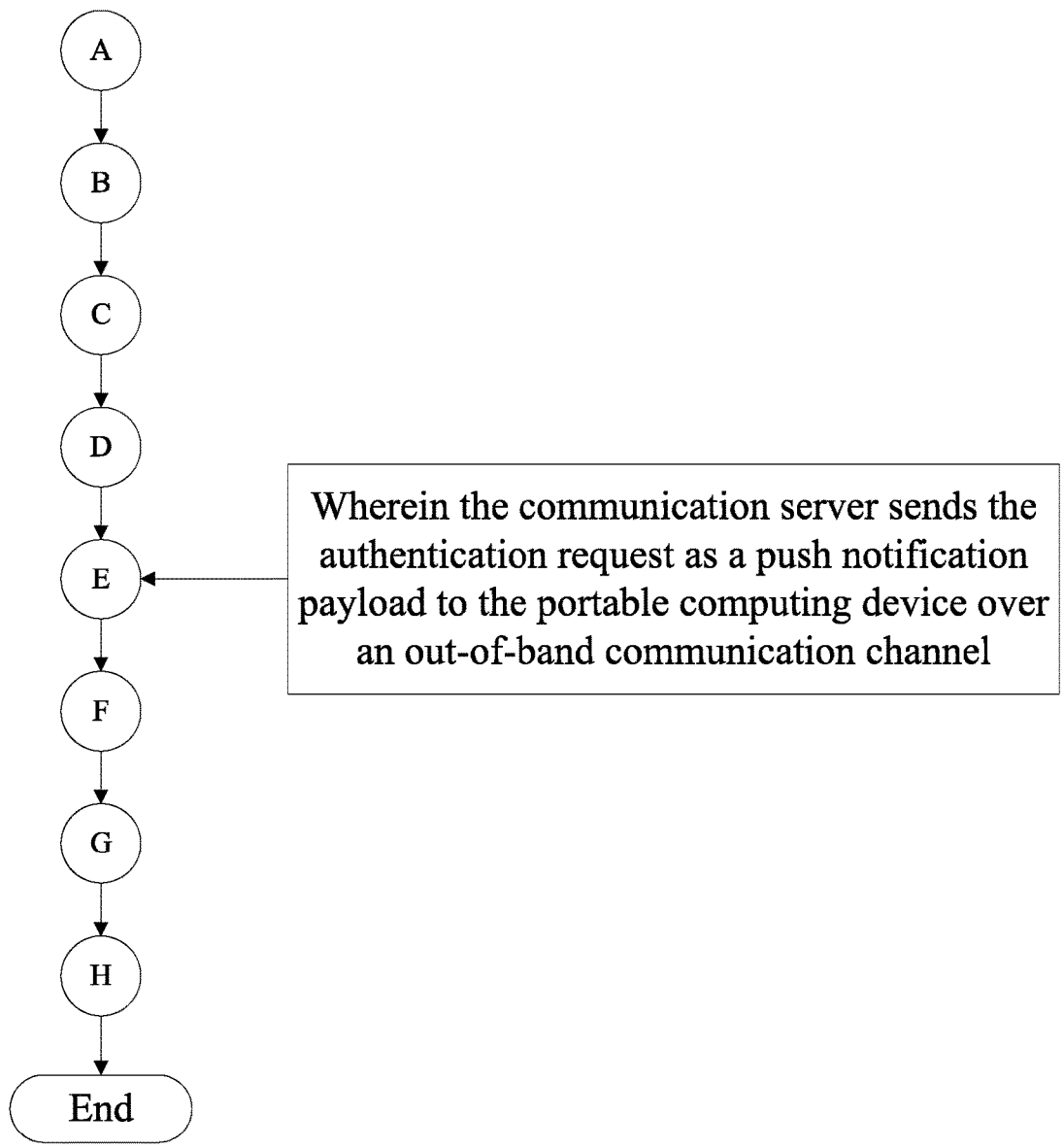
FIG. 9 is a flowchart of a sub-process that is followed by the present invention.

With reference to FIG. 8, an additional sub-process for the method of the present invention is herein discussed. The authentication request is received with the communication server during Step E. The authentication request includes a specific session ID, the user entry, and the digital return address. The specific session ID and the digital return address are recompiled into an authentication request with the communication server. More specifically, the communication server "unpacks" the authentication request that is received from the authentication server and resolves the portable computing device's hardware communication ID by the AIC. The authentication request is then sent from the communication server to the portable computing device identified by the hardware communication ID during Step E if the user entry matches the AIC assigned to the portable computing device. With reference to FIG. 9, in the preferred embodiment of the present invention, the communication server sends the authentication request as a push notification payload to the portable computing device over an out-of-band communication channel. The out-of-band communication channel serves as a separate authentication channel that provides an additional layer of security to the authentication process. The portable computing device is then used to locate user verification data for the relying party.

Figure 10:
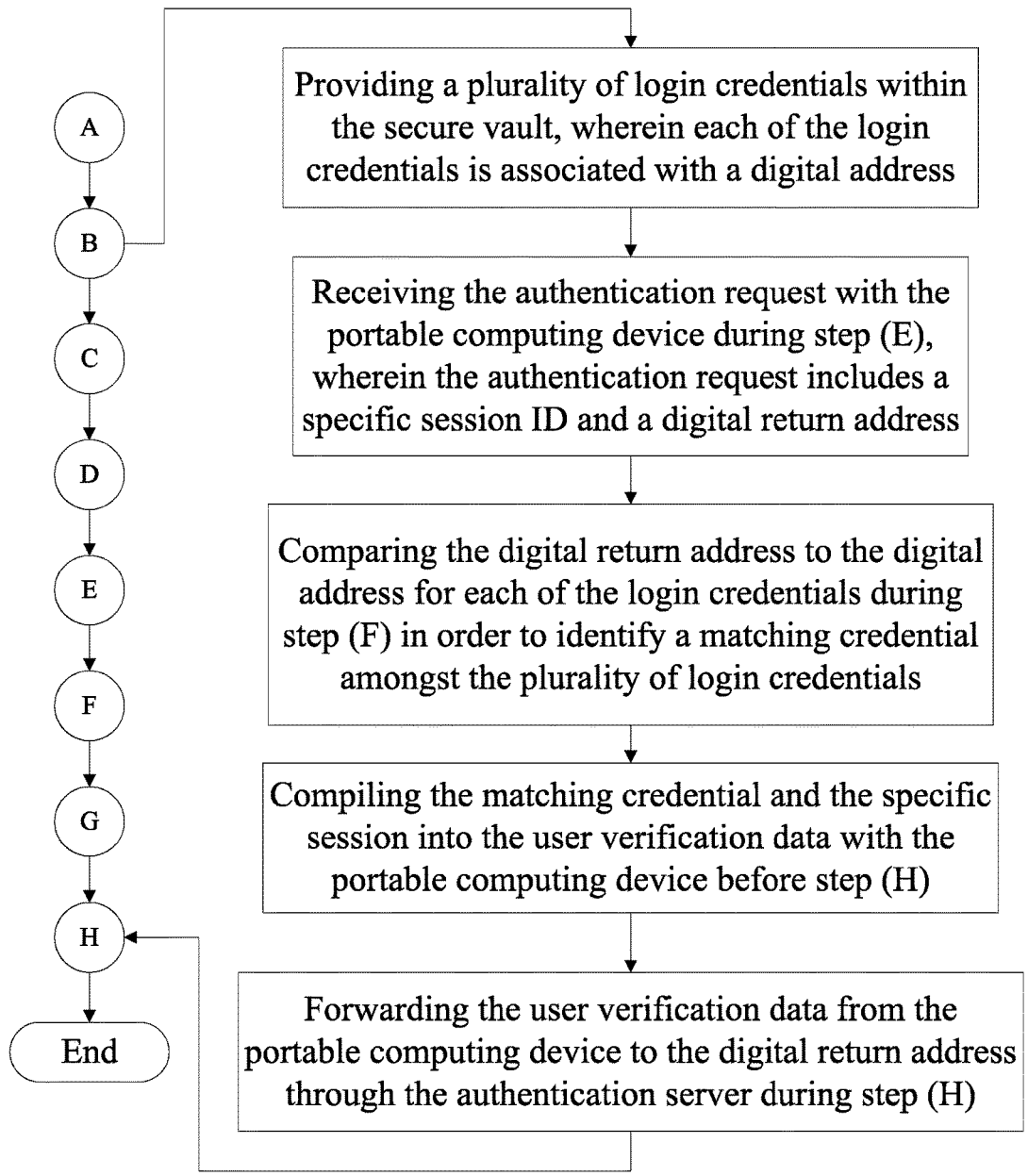
FIG. 10 is a flowchart of a sub-process that is followed by the present invention.

With reference to FIG. 10, a subsequent sub-process for the method of the present invention is herein discussed. A plurality of login credentials is provided within the secure vault. Each login credential is associated with a digital address in the form of a URI. More specifically, each login credential is utilized to log into a corresponding relying party at the digital address specified by the URI. The digital address is utilized in order to identify the relying party to which the user is attempting to gain access. The authentication request is received with the portable computing device during Step E and includes the specific session ID and a digital return address. The digital return address is compared to the digital address for each of the plurality of login credentials during Step F in order to identify a matching credential amongst the plurality of login credentials. The matching credential is key information that ultimately grants the user login at the relying party. The matching credential and the specific session ID are compiled into the user verification data with the portable computing device before Step H. The user verification data is forwarded from the portable computing device to the digital return address through the authentication server during Step H. The user verification data is thus able to grant the user login at the relying party.

Figure 11:
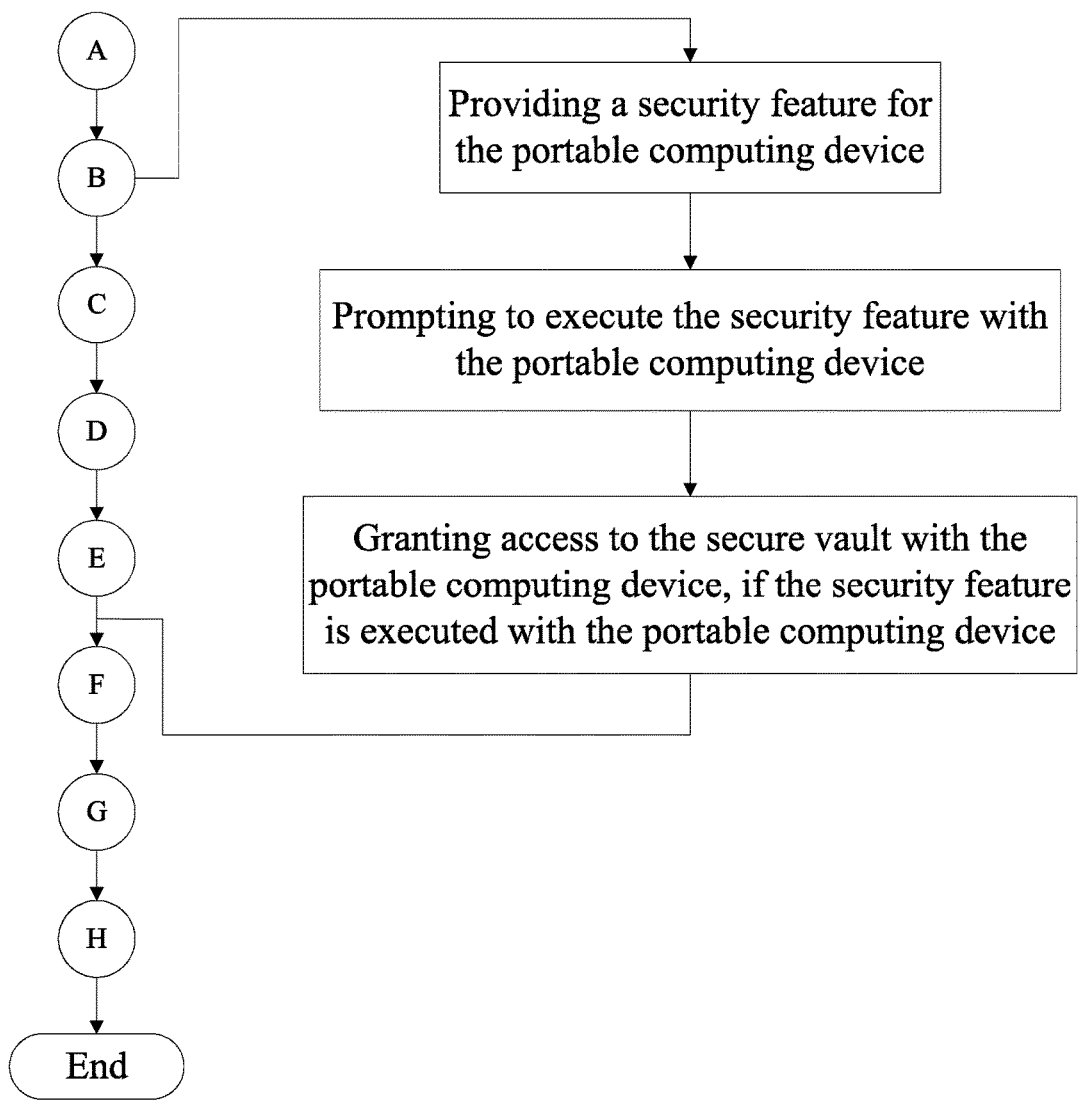
FIG. 11 is a flowchart of a sub-process that is followed by the present invention.

With reference to FIG. 11, a security feature is utilized for the portable computing device in order to prevent unauthorized access to the portable computing device. The security feature may include, but is not limited to, a fingerprint scanning sensor and a location sensor. In the case of a location sensor, the security feature may prevent access to the secure vault if the portable computing device has traveled from an established location. The user is prompted to execute the security feature with the portable computing device before being granted access to the secure vault. Access to the secure vault with the portable computing device is granted if the security feature is executed with the portable computing device, verifying that the user satisfied the security feature.

Figure 12:
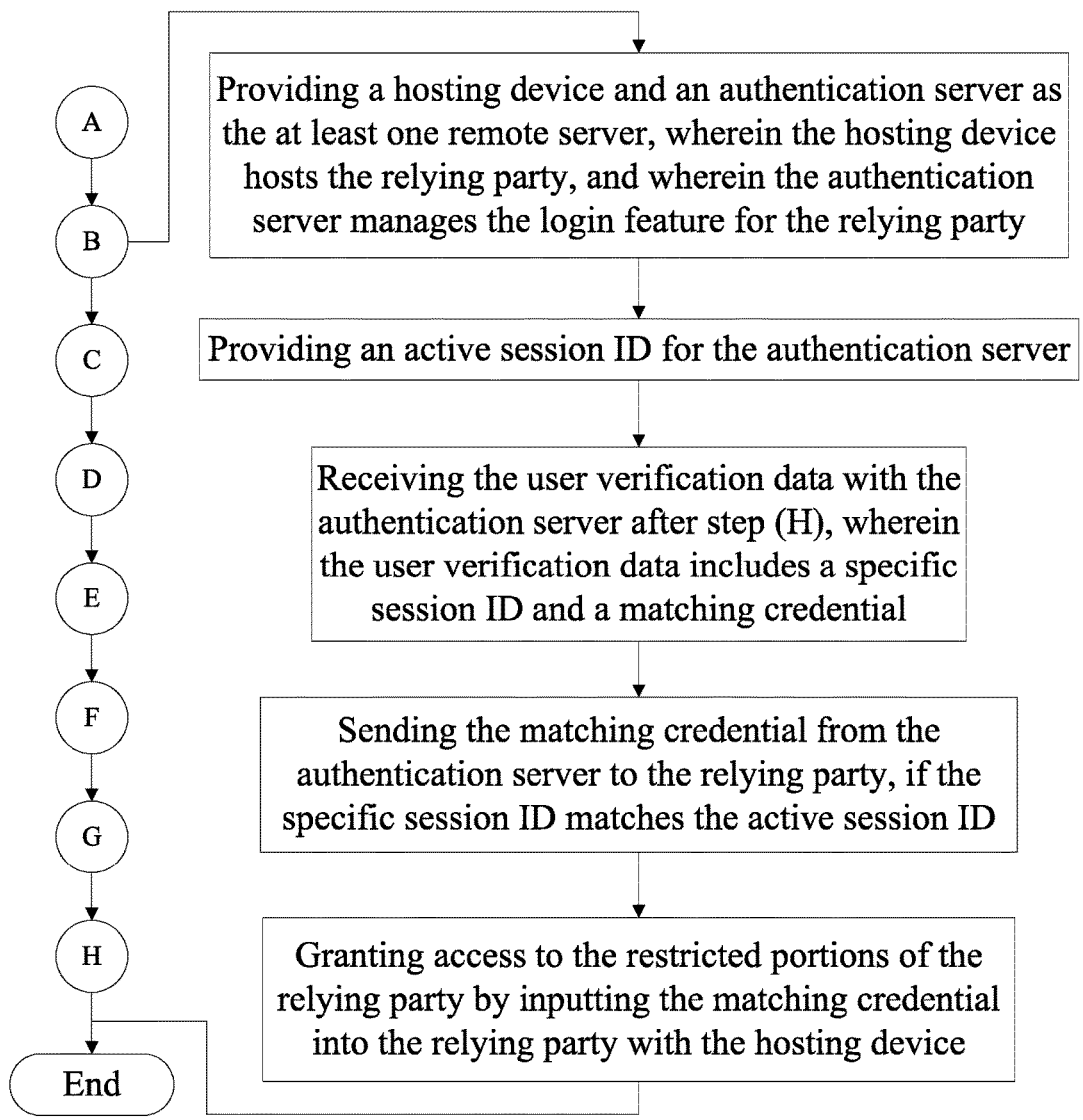
FIG. 12 is a flowchart of a sub-process that is followed by the present invention.
Figure 17:
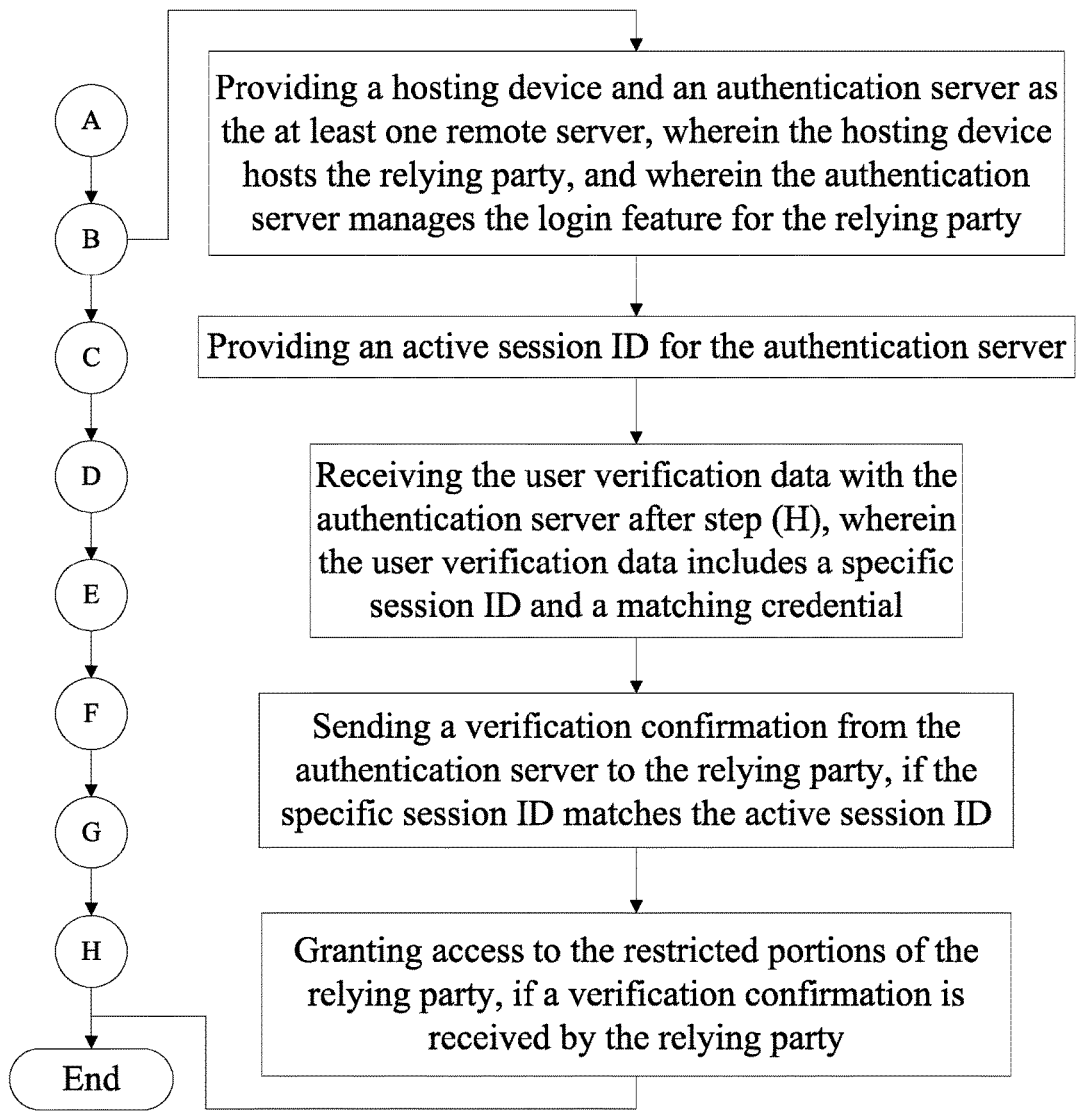
FIG. 17 is a flowchart of a sub-process that is followed by the present invention.

With reference to FIG. 12, an additional sub-process for the method of the present invention is herein discussed. The user verification data is received with the authentication server after the user verification data is sent from the portable computing device to the remote server. As previously discussed, the user verification data includes a specific session ID and a matching credential. In one embodiment, the matching credential is sent from the authentication server to the relying party if the specific session ID matches the active session ID. Access is granted to the restricted portions of the relying party by inputting the matching credential into the relying party with the hosting device. With reference to FIG. 17, in another embodiment, the matching credential verified is not transmitted to the relying party, instead it is verified at and with the authentication server itself, which will then forward a verification confirmation to the relying party instead of the actual matching credential. It is important to note that in the later embodiment, the matching credential is not stored by the relying party, hence eliminates the risk of credential breach at the relying parties.

Figure 13:
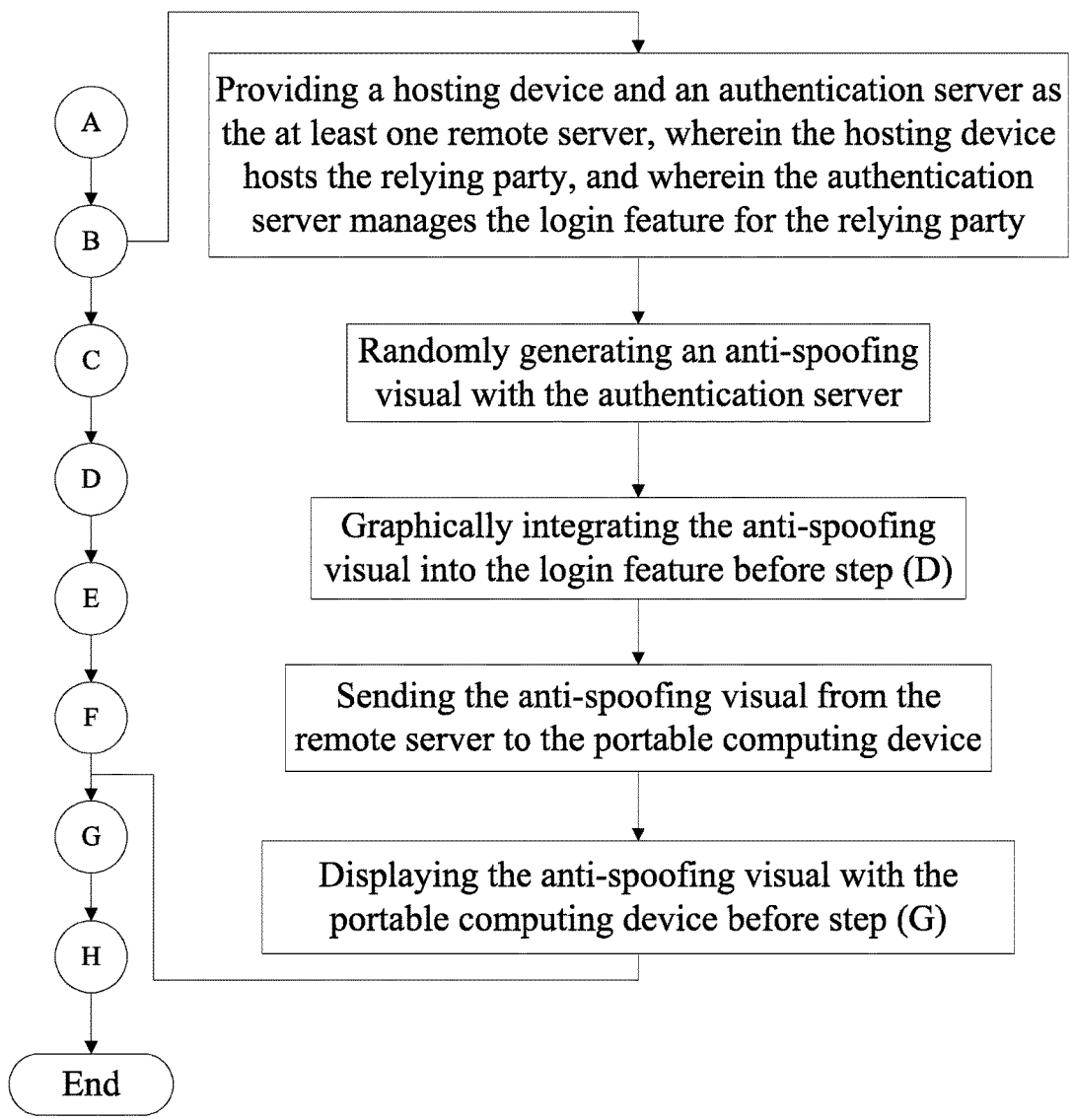
FIG. 13 is a flowchart of a sub-process that is followed by the present invention.

With reference to FIG. 13, an anti-spoofing visual may be utilized to further boost the security of the present invention. The anti-spoofing visual is randomly generated with the authentication server. The anti-spoofing visual may be a random word or graphical image that is assigned to the active session. The anti-spoofing visual is graphically integrated into the login feature before Step D. In the preferred embodiment of the present invention, the anti-spoofing visual is positioned adjacent to the AIC entry field in the login feature. The anti-spoofing visual is sent from the remote server to the portable computing device for user verification. The anti-spoofing visual is displayed with the portable computing device before Step G. As such, the user may match the anti-spoofing visual that is displayed as a part of the login feature with the anti-spoofing visual that is displayed on the portable computing device in order to ensure that the remote login session has not been replaced or tampered with.

Figure 14:
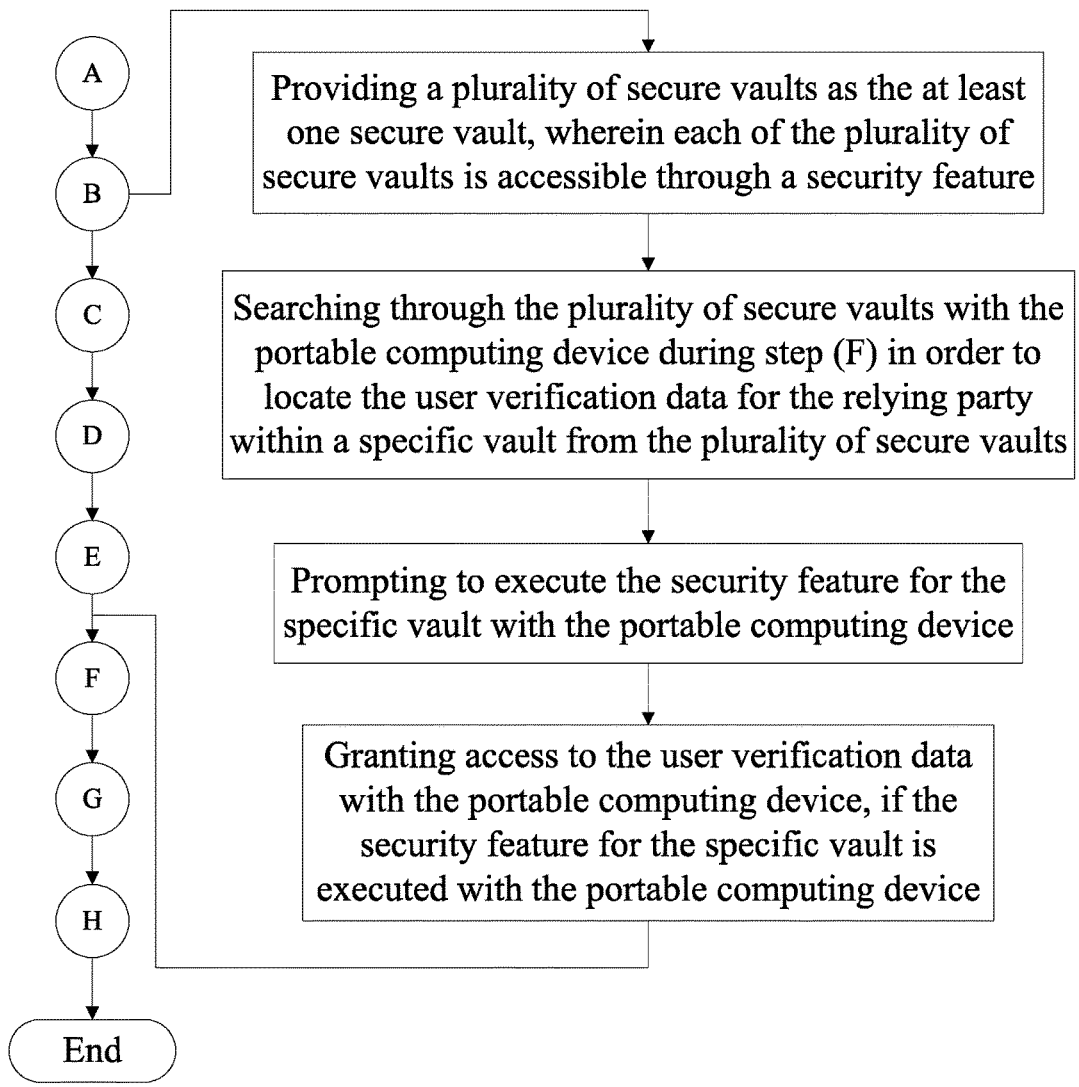
FIG. 14 is a flowchart of a sub-process that is followed by the present invention.

With reference to FIG. 14, in some embodiments of the present invention, at least one secure vault can be a plurality of secure vaults, each of which is accessible through a security feature. The plurality of secure vaults is searched through with the portable computing device during Step F in order to locate the user verification data for the relying party within a specific vault from the plurality of secure vaults. The user is prompted to execute the security feature for the specific vault with the portable computing device in order to gain access to the specific vault. The security feature for each of the plurality of secure vaults may vary. Access to the user verification data is granted with the portable computing device if the security feature for the specific vault is executed with the portable computing device. It is important to note that access is only granted to the specific vault for which the security feature is executed.

At least one anti-tamper token is generated with the remote server before the user entry is received through the login feature. The anti-tamper token is utilized to provide an additional layer of security to the user entry. The anti-tamper token is sent together with the authentication request and the response to guard the integrity of the system against tampering, replay or MiM (Man-in-the-Middle) attacks, etc.

Figure 15:
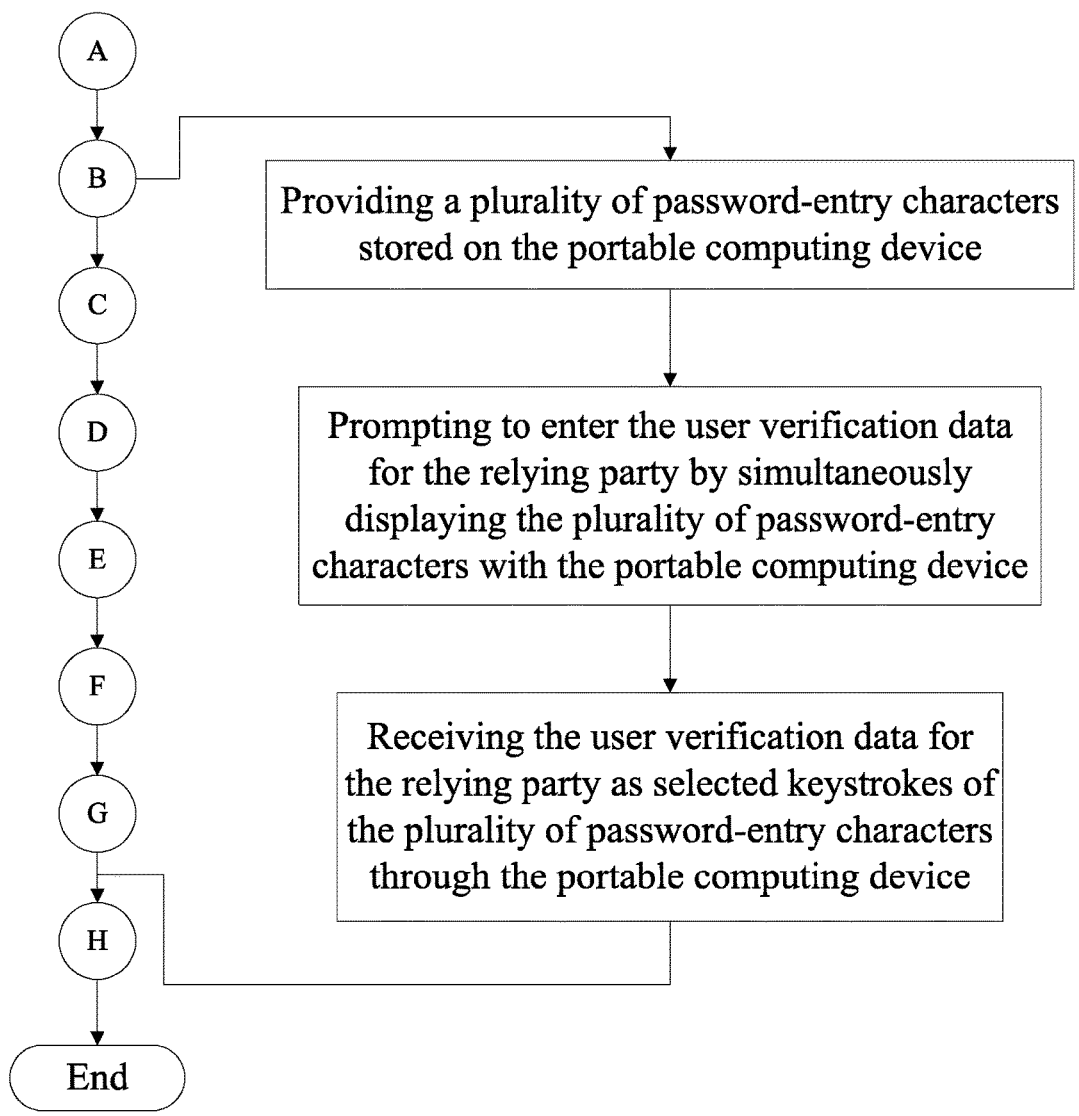
FIG. 15 is a flowchart of a sub-process that is followed by the present invention.

With reference to FIG. 15, a plurality of password-entry characters is utilized by the portable computing device and is utilized by the user when entering the user verification data. The user is prompted to enter the user verification data for the relying party by simultaneously displaying the plurality of password-entry characters with the portable computing device. In the preferred embodiment of the present invention, the plurality of password-entry characters is displayed in the form of a specialized keyboard on the portable computing device. The user verification data is received for the relying party as selected keystrokes of the plurality of password-entry characters through the portable computing device. In the preferred embodiment of the present invention, a specialized keyboard is designed in a manner such that the user may conveniently input complex credentials.

Figure 16:
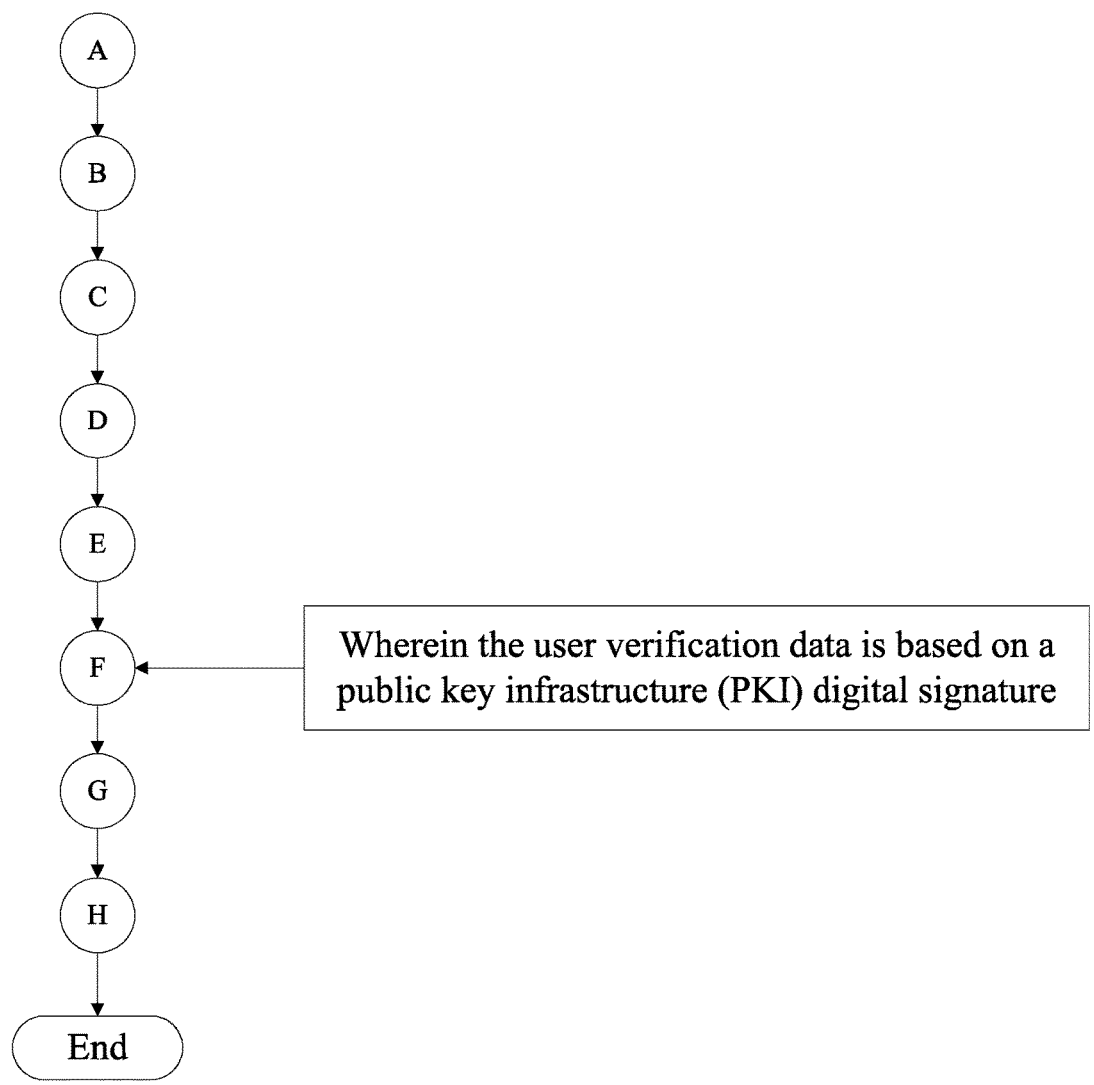
FIG. 16 is a flowchart of a sub-process that is followed by the present invention.

With reference to FIG. 16, the user verification data may also be based on a public key digital signature. A valid digital signature can only be generated using the private key that corresponds to the public key associated with a user identifying record stored in the portable computing device. Therefore, the digital signature can be integrated into the present invention as the user identity verification data.

Although the present invention has been explained in relation to its preferred embodiment, it is understood that many other possible modifications and variations can be made without departing from the spirit and scope of the present invention as hereinafter claimed.

What is claimed is:

1. A method of authentication by leveraging mobile devices for expediting user login and registration processes, the method comprising steps of:

(A) providing at least one remote server, wherein the remote server hosts a relying party with a login feature;

(B) providing a portable computing device, wherein the portable computing device is uniquely associated with an authentication initiation code (AIC) that is dynamically generated and stores at least one secure vault of personal identification data;

(C) displaying the AIC with the portable computing device;

(D) receiving a user entry of the AIC through the login feature with the relying party and creating a new secure login session associated with the AIC;

(E) locating the portable computing device associated with the AIC and sending an authentication request from the remote server to the portable computing device;

(F) searching through the secure vault with the portable computing device to extract user verification data for the relying party, wherein the user verification data is based on a digital signature that is generated by using a private key corresponding to a public key associated with a user identity record stored in the portable computing device;

(G) prompting a user to approve or to deny the authentication request with the portable computing device, if the user verification data for the relying party is found within the secure vault;

(H) sending the user verification data from the portable computing device to the remote server to grant access to restricted portions of the relying party, if the authentication request is approved through the portable computing device;

providing the at least one remote server as a hosting device and an authentication server, wherein the hosting device hosts the relying party, and wherein the authentication server manages the login feature for the relying party;

randomly generating an anti-spoofing visual with the authentication server;

displaying the anti-spoofing visual with the login feature before step (D);

sending the anti-spoofing visual from the remote server to the portable computing device as a part of the authentication request;

displaying the anti-spoofing visual with the portable computing device before step (G);

providing a plurality of secure vaults as the at least one secure vault, wherein each of the plurality of secure vaults is accessible through a security feature;

searching through the plurality of secure vaults with the portable computing device during step (F) in order to locate the user verification data for the relying party within a specific vault from the plurality of secure vaults;

prompting to execute the security feature for the specific vault with the portable computing device; and granting access to the user verification data with the portable computing device, if the security feature for the specific vault is executed with the portable computing device.

2. The method of authentication by leveraging mobile devices for expediting user login and registration processes as claimed in claim 1, the method comprising steps of:

(A) providing a communication server, wherein the communication server is communicably coupled in between the remote server and the portable computing device;

(J) registering a unique identifier of the portable computing device with the communication server;

(K) generating a unique sequence of numerical digits with the communication server;

(L) assigning the unique sequence of numerical digits as the AIC for the portable computing device; and (M) sending the random sequence of numerical digits from the communication server to the portable computing device.

3. The method of authentication by leveraging mobile devices for expediting user login and registration processes as claimed in claim 2, the method comprising steps of:

executing multiple iterations of steps (K) through (M) to update the AIC of the portable computing device; and maintaining a constant quantity for the random sequence of numerical digits between the multiple iterations of steps (K) through (M).

4. The method of authentication by leveraging mobile devices for expediting user login and registration processes as claimed in claim 2, the method comprising steps of:

executing multiple iterations of steps (K) through (M) to update the AIC of the portable computing device; and maintaining a variable quantity for the random sequence of numerical digits between the multiple iterations of steps (K) through (M).

5. The method of authentication by leveraging mobile devices for expediting user login and registration processes as claimed in claim 2, wherein the communication server and the portable computing device are communicably coupled to each other through a secure communication channel.

6. The method of authentication by leveraging mobile devices for expediting user login and registration processes as claimed in claim 1, the method comprising steps of:

providing a communication server, wherein the communication server is communicably coupled in between the remote server and the portable computing device;

providing the at least one remote server as a hosting device and an authentication server, wherein the hosting device hosts the relying party, and wherein the authentication server manages the login feature for the relying party;

prompting to reroute from the relying party to the login feature with the authentication server during step (D);

generating a unique session ID for the user entry with the relying party, before the user entry is rerouted from the relying party to the login feature with the authentication server;

receiving the unique session ID and the user entry through the login feature with the authentication server during step (D);

compiling the unique session ID, the user entry, and a digital return address for the relying party into the authentication request with the authentication server; and sending the authentication request from the authentication server to the communication server after step (E).

7. The method of authentication by leveraging mobile devices for expediting user login and registration processes as claimed in claim 1, the method comprising steps of:

providing a communication server, wherein the communication server is communicably coupled in between the remote server and the portable computing device;

receiving the authentication request with the communication server during step (E), wherein the authentication request includes a unique session ID, the AIC, and a digital return address;

recompiling the specific unique session ID, the AIC and the digital return address into the authentication request with the communication server; and sending the authentication request from the communication server to the portable computing device during step (E), if the user entry matches the AIC associated to the portable computing device.

8. The method of authentication by leveraging mobile devices for expediting user login and registration processes as claimed in claim 7, wherein the communication server sends the authentication request as a push notification payload to the portable computing device over an out-of-band communication channel.

9. The method of authentication by leveraging mobile devices for expediting user login and registration processes as claimed in claim 1, the method comprising steps of:

providing a plurality of login credentials within the secure vault, wherein each of the login credentials is associated with a digital address;

receiving the authentication request with the portable computing device during step (E), wherein the authentication request includes a unique session ID and a digital return address;

comparing the digital return address in the request received to the digital address for each of the credential during step (F) in order to identify a matching credential amongst the plurality of login credentials;

compiling the matching credential and the unique session ID into the user verification data with the portable computing device before step (H); and forwarding the user verification data from the portable computing device to the digital return address through the authentication server during step (H).

10. The method of authentication by leveraging mobile devices for expediting user login and registration processes as claimed in claim 9, the method comprising steps of:

providing a security feature for the portable computing device;

prompting to execute the security feature with the portable computing device; and granting access to the secure vault with the portable computing device, if the security feature is executed with the portable computing device.

11. The method of authentication by leveraging mobile devices for expediting user login and registration processes as claimed in claim 1, the method comprising steps of:

providing a hosting device and an authentication server as the at least one remote server, wherein the hosting device hosts the relying party, and wherein the authentication server manages the login feature for the relying party;

providing an active session ID for the authentication server;

receiving the user verification data with the authentication server after step (H), wherein the user verification data includes a specific session ID and a matching credential;

sending the matching credential from the authentication server to the relying party, if the specific session ID matches the active session ID; and granting access to the restricted portions of the relying party by inputting the matching credential into the relying party with the hosting device.

12. The method of authentication by leveraging mobile devices for expediting user login and registration processes as claimed in claim 1, the method comprising steps of:

providing a plurality of characters that are eligible for use in a password on the portable computing device;

prompting to enter the user verification data for the relying party by simultaneously displaying the plurality of characters in a single screen on the portable computing device; and verifying access to the secure vault with the password entered as keystrokes of the plurality of characters through the portable computing device.

13. The method of authentication by leveraging mobile devices for expediting user login and registration processes as claimed in claim 1, the method comprising steps of:

providing the at least one remote server as a hosting device and an authentication server, wherein the hosting device hosts the relying party, and wherein the authentication server manages the login feature for the relying party;

providing a unique session ID for the authentication server;

receiving the user verification data with the authentication server after step (H), wherein the user verification data includes the unique session ID and a matching credential;

sending a verification confirmation from the authentication server to the relying party, if the unique session ID matches the active session ID; and granting access to the restricted portions of the relying party, if validation of the user verification data is received by the relying party, wherein the validation of the user verification is done by using a user registration information with the relying party, or is done by a session specific digital signature generated by using the private key that belongs to the user and is stored on the portable computing device.

* * * * *